Figure 1:
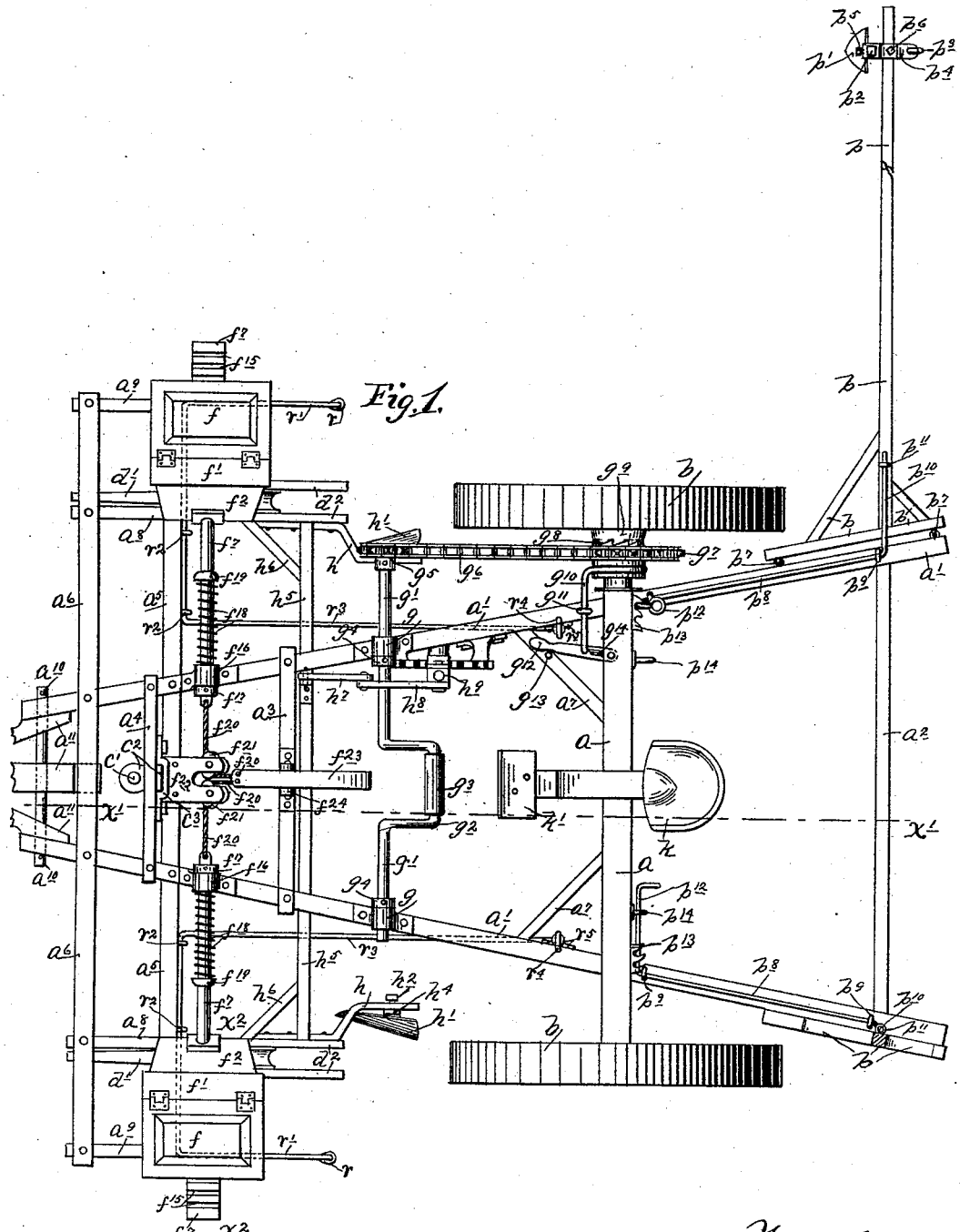

(No Model.) 3 Sheets—Sheet 1.

H. H. GUNNER & F. O. SHIRLEY.
CORN PLANTER.

No. 529,167. Patented Nov. 13, 1894.

Witnesses,
E. F. Elmore
Frank D. Merchant

Inventors
Henry H. Gunner
Frank O. Shirley
By their Attorney,
Jas. F. Williamson (No Model.) 3 Sheets—Sheet 2.

H. H. GUNNER & F. O. SHIRLEY.
CORN PLANTER.

No. 529,167. Patented Nov. 13, 1894.

Fig. 2.

Witnesses
E. F. Elmore
Frank D. Morchant

Inventors
Henry H. Gunner
Frank O. Shirley
By their Attorney
Jas. F. Williamson (No Model.) 3 Sheets—Sheet 3.
H. H. GUNNER & F. O. SHIRLEY.
CORN PLANTER.
No. 529,167. Patented Nov. 13, 1894.
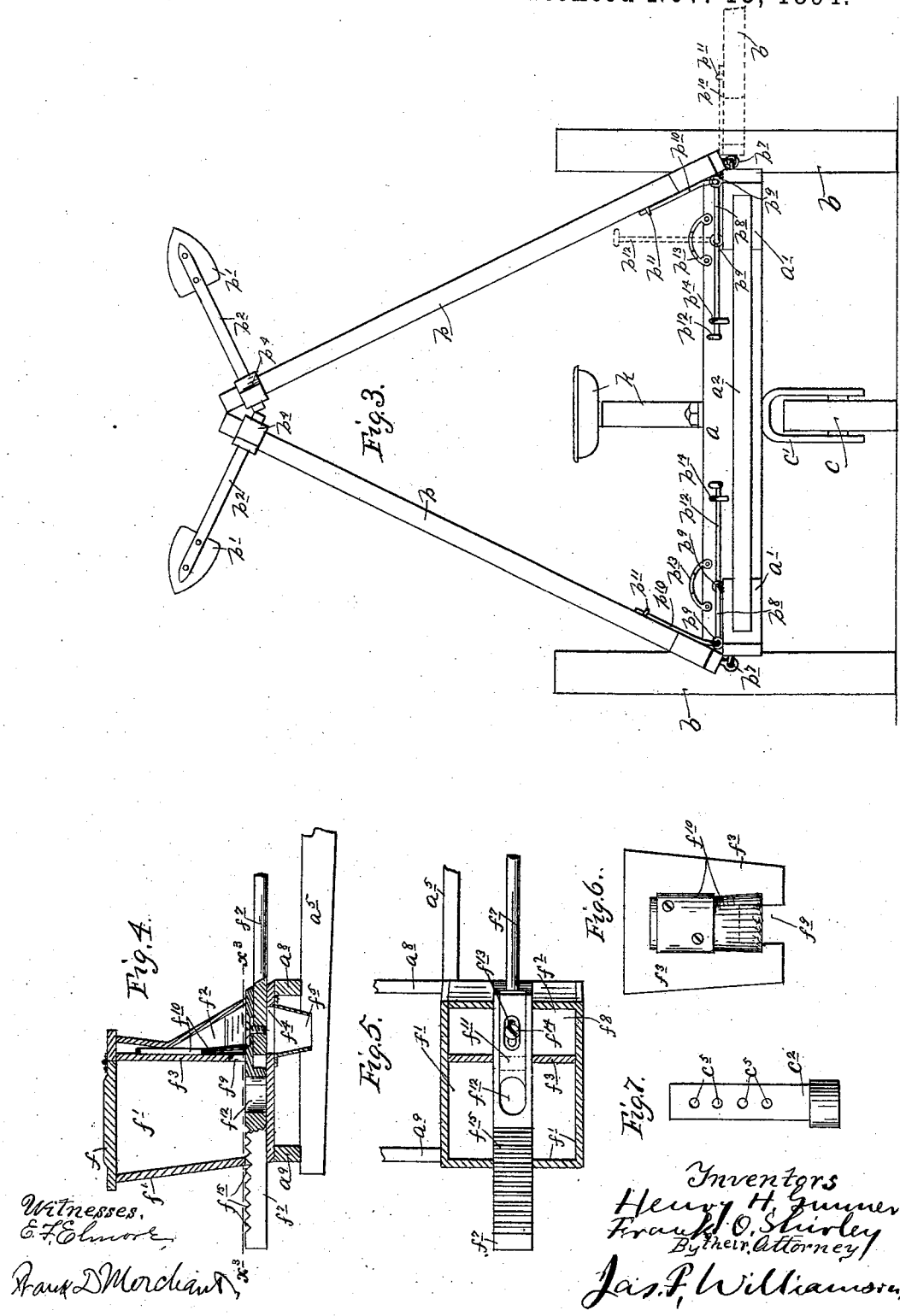
Witnesses.
E. F. Elmore
Frank D. Morehart
Inventors
Henry H. Gunner
Frank O. Shirley
By their Attorney
Jas. F. Williamson

UNITED STATES PATENT OFFICE.

HENRY H. GUNNER AND FRANK O. SHIRLEY, OF NORTHFIELD, MINNESOTA.

CORN-PLANTER.

SPECIFICATION forming part of Letters Patent No. 529,167, dated November 13, 1894.

Application filed April 24, 1894. Serial No. 508,816. (No model.)

*To all whom it may concern:*

Be it known that we, HENRY H. GUNNER and FRANK O. SHIRLEY, citizens of the United States, residing at Northfield, in the county of Rice and State of Minnesota, have invented certain new and useful Improvements in Corn-Planters; and we do hereby declare the following to be a full, clear, and exact description of the invention, such as will enable others skilled in the art to which it appertains to make and use the same.

Our invention has for its object to provide an efficient two-row planter, for planting corn and similar material, which machine shall be of simple and cheap construction.

To this end, the invention consists of certain novel devices and combinations of devices, which will be hereinafter described and be defined in the claims.

Our invention is illustrated in the accompanying drawings, wherein like letters refer to like parts, throughout the several views.

Figure 1 is a plan view of our improved machine, with some parts broken away, and others shown in section. Fig. 2 is a longitudinal vertical section, on the line X' X' of Fig. 1, with some parts broken away. Fig. 3 is a rear elevation of the machine, with the markers in their turned up or idle position, some parts being shown in diagram lines only. Fig. 4 is a vertical cross section, through the left hand seed-box, on the line $X^2 X^2$ of Fig. 1, with some parts broken away. Fig. 5 is a horizontal section, on the line $X^3 X^3$ of Fig. 4. Fig. 6 is a detail in plan view, showing one of the seed-box partitions or division plates, with striker brush detached; and Fig. 7 is a detail in plan view, showing the caster-wheel holder detached.

The main frame of the machine is made up of the axle $a$, the convergent longitudinal side-bars $a'$, cross-ties $a^2 a^3 a^4 a^5 a^6$, diagonal braces $a^7 a^9$, end pieces $a^8$, connecting the cross-ties $a^5 a^6$, and backwardly extended arms $a^9$, fixed to the outer ends of the cross-tie $a^6$. The side-bars $a'$ are extended forward of the front cross-tie $a^6$, and have pivoted thereto by coupling-bolt $a^{10}$, a tongue or pole $a^{11}$, for the application of the horses or other draft animals.

The main frame of the machine is supported by the pair of main wheels $b$, which are loosely mounted on the spindles of the axle $a$, and by a centrally located caster wheel $c$, under the forward end of the frame. The caster-wheel yoke $c'$ is swiveled in the lower end of a holder $c^2$, which works in keepers $c^3$, fixed to the cross-ties $a^4$ and $a^5$, and is held therein, in any desired adjustment, by a nutted-bolt $c^4$, working through any one of a series of holes $c^5$ in said holder $c^2$, and through suitable seats in the cross-tie $a^4$ and the upper member of the keeper $c^3$.

To lugs $d$, fixed to the under surface of the forward cross-tie $a^6$, is pivoted a pair of furrow openers, each of which is in the form of a shoe $d'$, with a pair of rearwardly extended flanges $d^2$, spaced apart sufficiently far to form the opening or furrow. These two furrow openers are laterally spaced apart a distance equal to the distance between two of the desired rows of corn or other material to be planted. Directly over the said furrow openers is located a pair of droppers, comprising suitable seed-boxes $f f' f^2 f^3 f^4$; suitable seed-tubes $f^5$, pivoted seed-boots $f^6$, and reciprocating feed-slides $f^7$. The delivery seed-tubes $f^5$ are preferably made of flexible material and extend into the pivoted seed-boots $f^6$, which are made of metal. The seed-boots $f^6$ depend from their pivots $f^8$ with their lower ends working between the flanges $d^2$ of the furrow openers.

Having regard to the seed-boxes, the vertical partitions $f^3$ divide the same into the holding sections $f'$ and the discharge sections $f^2$, wherein are located the outlet openings $f^4$. The said partitions or division plates $f^3$ are provided with passages $f^9$, for the working therethrough of the feed-slide $f^7$, and to the exterior surface of the said partition $f^3$ is fixed a striker-brush $f^{10}$ with its bristles in position to sweep the face of the feed slide $f^7$, on its outward passage through the division plate. The partition $f^3$ is removably mounted in the seed-box and may be readily removed, for inspection or repair of the parts. The feed-slides are cut away and fitted with an adjustable block $f^{11}$, to form a feed-cell $f^{12}$ of any desired size, according to the number of grains of corn or other seed it is desired to drop in a place. The block $f^{11}$ is provided with a slot $f^{13}$, through which works a set-screw $f^{14}$, into a suitable seat in the slide $f^7$, for holding the said block wherever set. The slide $f^7$ has projections $f^{15}$, on the part of the same outward of the cell $f^{12}$, which projections serve to loosen up the corn or other seeds and prevent the same from clogging, when damp or musty, against the sides of the box. The stems of the slides $f^7$ extend inward toward the center of the machine, through guide keepers $f^{16}$ on the side bars $a'$, and are provided with collars or enlarged heads $f^{17}$, at the inner ends, for limiting the closing movement of the slides. The slides are subject to the action of springs $f^{18}$, encircling the same, between the keepers $f^{16}$ and collars $f^{19}$, fixed to the slides, which springs tend to throw the feed slides into their closed position.

To the inner ends of the feed slides are attached flexible connections $f^{20}$, which pass over guide-sheaves $f^{21}$, held by a forked sheave-block or bracket $f^{22}$, fixed to the cross tie $a^5$, and extend to the forward end of a lever $f^{23}$, pivoted to bearing lugs $f^{24}$, on the cross tie $a^3$, for pivotal motion in the vertical plane. In bearings $g$, on the side-bars $a'$ is mounted a constantly running shaft $g'$ $g^2$, of which, the part $g^2$ is in the form of a crank section, which serves as a cam for operation on the rear end of the pivoted lever $f^{23}$, at each turn of the shaft. As shown, the crank cam section $g^2$, is fitted with a roller sleeve $g^3$, for taking the blow on the lever $f^{23}$. The shaft $g'$ $g^2$ is held from axial or sliding motion by fixed collars $g^4$, bearing against the boxes $g$. On the right end of the said shaft is fixed a sprocket $g^5$, connected by chain $g^6$ with a sprocket $g^7$ loosely mounted on the axle $a$, adjacent to the right hand supporting wheel $b$. The sprocket $g^7$ is free for sliding motion on the axle $a$, and is provided on the outer end of its hub with a half clutch $g^8$, which co-operates with a corresponding half clutch $g^9$ on the inner hub of the supporting wheel $b$. On the inner end of its hub, the said sprocket $g^7$ is fitted with shipper-fork $g^{10}$, working through a keeper $g^{11}$, and attached at its inner end to a pivoted hand-lever $g^{12}$, which is engageable on either side of a retaining pin or lug $g^{13}$, to hold the two members of the clutch $g^8$ $g^9$ either in or out of gear with each other. The hand-lever $g^{12}$ is subject to the action of a spring $g^{14}$, which tends to hold the same down flatwise, and insures the retention of the lever by the stop-pin $g^{13}$, while permitting a limited upward motion to the lever, for releasing it from the pin.

With the construction so far described, it is obvious that on every revolution of the shaft $g'$ $g^2$, the pivoted lever $f^{23}$ will be thrown down at its rearmost end, thereby raising its forward end and drawing the slides $f^7$ inward against the tension of the springs $f^{18}$, and that, when the roller $g^3$ passes off from the rear end of the lever $f^{23}$, the compressed springs $f^{18}$ will return the feed-slides into their closed and normal position.

The sprocket $g^7$ is relatively large, as compared with the sprocket $g^5$, the proportions being such, with respect to each other and the wheels $b$, as to effect the dropping action at the desired intervals of time, so as to space the hills apart from each other in the rows the desired distances. If, for example, the circumference of the wheel $b$ should be eleven feet, and it is desired to space the hills three feet nine inches apart, the sprockets $g^7$ and $g^5$ would be related as three to one. Directly to the rear of the furrow openers $d'$ $d^2$, and supported therefrom by the angular brackets $h$, are located covering shovels $h'$, at points offset from the center line of the furrows, which shovels are operated to cover the corn or other seed deposited by the droppers. The shovels $h'$ are attached to the brackets $h$ by nutted bolts $h^2$, working through slots $h^3$ in standards $h^4$ fixed to the shovels; which construction permits the shovels to be adjusted on the brackets $h$ to regulate the depth at which they are to run. A cross tree $h^5$ with corner braces $h^6$ connects the pair of angular brackets $h$, together with the furrow opening shoes and the covering shovels, to which the said brackets are attached. A link $h^7$ connects the said cross tree $h'$ to an arm $h^8$ on a spring-pawl hand-lever $h^9$, pivoted to the right hand side bar $a'$, the pawl of which lever is engageable with a lock-segement $h^{10}$, also fixed to the said side-bar, for holding the shoes and shovels in any desired position, either for setting the same to run at the desired depth, or for raising the same clear of the ground.

To the axle $a$, central thereof, is secured a spring-seat $k$ and a spring-foot board $k'$, for the driver, in position to enable him to reach the various levers which he may have occasion to operate.

The side-bars $a'$ of the main frame are extended to the rear of the main-wheels $b$, and have pivotally attached thereto, a pair of marker arms $p$, carrying, at their outer ends, marker shovels $p'$ adjustably supported thereon by shovel-standards $p^2$ and angular braces $p^3$, which work through head-blocks $p^4$, and are held by jam-screws $p^5$; or in any other suitable way. The head-blocks $p^4$ are adjustable longitudinally of the arms $p$ and securable thereon in any desired position, by jam-screws $p^6$. The pivotal connections between the marker arms $p$ and the side-bars $a'$ of the main frame, are effected by eye-bolts $p^7$. The markers are yieldingly held in their working position from the said main frame by a holder composed of a rod having the body portion $p^8$, arranged lengthwise of the side-bar $a'$, and secured thereto with freedom for rocking motion by staples $p^9$, a rear end angularly extended or crank-like portion $p^{10}$, secured to the marker-arm $p$ by staple $p^{11}$, beyond the pivotal eye-bolts $p^7$; and an angularly extended or crank-like handle portion $p^{12}$, at its forward end, by which the said holder and the marker connected therewith may be manipulated. The handle arm $p^{12}$ is engageable with a notched lock plate $p^{13}$, to set and hold the marker-shovel, for any desired depth of score, when in working position; and the said handle portion $p^{12}$ is engageable under a hook $p^{14}$ on the axle, to hold the markers in their upturned or idle position, over the main frame, as shown in Fig. 3. The holders above described, in virtue of their angular form and stapled connections with the main frame and the marker arm, serve to hold the markers in working position with the necessary rigidity, while at the same time, permitting the markers to yield by the spring in the holder, under the torsional strain thereon, sufficiently for the clearance or passage over an obstruction.

Having regard to the operation of the machine as an entirety, it will be understood from the foregoing description, that the furrow opening shoes and the main wheels $b$ are laterally spaced apart a distance equal to that between two of the desired rows of corn or other materials to be planted, and that the said main wheels $b$ are longitudinally in line with the said shoes, so as to follow on the covered furrows turned in by the covering shovels $h'$. The said shovels $h'$ are offset inward from the center line of the furrow, and are set at an angle, so as to catch and turn back the ridge of the furrow opened by the shoes and cover the grain to the desired depth, without leaving a deep furrow behind the shovel. The droppers, as before stated, have their parts suitably located to deliver the corn, or other material, between the flanges $d^2$ of the furrow opening shoes, so that the same will drop to the bottoms of the opened furrows. Hence, under the forward movement of the machine, the furrows will be opened, the corn will be dropped at the desired intervals, the covering of the same will be effected by the shovels $h'$, and the main wheels $b$ will follow on the crest of the covered furrow, and serve both to pack down the seed bed and level off the top surface of the same; and under the spreading action from said wheels $b$, on the covered furrow, the shallow side furrows opened by the covering shovel $h'$, will be refilled or nearly so, so as to leave the whole surface comparatively level, on and adjacent to the seed-bed.

The machine is designed to turn both right and left, so as to plant continuously from one side of the field toward the other. Hence, in going in one direction, one of the markers will be down, for example, the right hand member, shown in Fig. 1, for scoring the line in the next adjacent row; and the other marker will be locked up, over the machine, in its idle position. When the machine is going in the opposite direction, the left hand marker will be turned down, for marking the line of the next row, and the right hand marker will be turned up into its idle position over the machine. When on the road or moving from one field to another, both of the markers may be turned up into their idle position, as shown in Fig. 3. At the end of the row, when turning the machine, the droppers will be thrown out of gear with the main wheels $b$, by manipulating the hand-lever $g^{12}$, and the marker last in use will also be turned up into its idle position, thereby permitting the machine to be turned in a small space; when the droppers will be again thrown into gear, and the opposite marker dropped down into working position. The parts are all spaced for scoring and planting rows, with lateral spacing of about three feet nine inches, and for dropping the hills of corn in the rows, at about the same spacing of three feet nine inches; and the cell $f^{12}$ in each of the feed slides $f^7$ is of a size to drop from three to five grains, of ordinary sized corn, in a hill. It will, of course, be understood, however, that the parts may be set for any desired spacing of the hills in the row, or of the rows, in respect to each other.

With the parts so far described, the machine would be capable of planting the corn, or other materials, in rows, for cultivation in one direction only; but by a simple attachment, we render the machine capable of spacing the hills at equal distances apart in lines at right angles to each other, so that the corn can be cultivated in two directions. This device is in the nature of a marker, for denoting the position of the hill last dropped, before turning the machine. As shown, this marker comprises a small shovel $r$ carried on the lower vertical section $r'$ of a bent rod, the horizontal section of which is pivoted at its bail portion to the cross-tie $a^5$, as shown at $r^2$, and is provided with a rearwardly extended section $r^3$, extending lengthwise of the frame and upturned at its rear end, to form a vertical handle section $r^4$. This vertical section $r^4$ passes up through a keeper $r^5$, fixed to the longitudinal timber $a'$, and is subject to the action of a spring $r^6$, reacting against the said keeper and a collar $r^7$ on said section $r^4$. Under the tension from the spring $r^6$, the section $r^4$ will be held in its uppermost position with the shovel $r$ above the level of the ground. On reaching the last hill in the row, the driver will push down the handle section $r^4$ against the spring $r^6$, thereby indicating the position of the hill last dropped. This mark will be to one side of the row; and on turning the machine, the first hill may be dropped into a transverse line with the said mark and the hill last planted in the preceding row. The machine is equipped with two of these markers, $r$, located, one on each side of the machine, with the handle sections thereof within reach of the driver on the seat $k$. This permits the driver to mark the hill last dropped outside and adjacent to the next row to be planted, regardless of the direction in which the machine is to be turned.

The clutch device $g^8$ $g^9$, under the control of the hand-lever $g^{12}$, enables the dropping mechanism to be thrown in and out of gear at the proper time, for insuring the first drop on the new row, to be made at the proper time. This is most easily done, by throwing the clutch section $g^8$ out of gear, after passing the last hill and just when the roller $g^3$ on the cam crank $g^2$ is about to strike the pivoted lever $f^{23}$, for another hill; and then on turning the machine, the clutch will be thrown into gear when the hill mark is reached.

It should perhaps be noted, that the vertically adjustable caster-wheel permits the front end of the machine to be supported at the proper level, for the easiest draft, according to the height of the particular team employed.

By actual usage, we have demonstrated the practicability of this machine to do the work, for which it was designed. The simplicity of construction enables the machine to be made at a small cost.

What we claim, and desire to secure by Letters Patent of the United States, is as follows:

1. In a two-row planter, the combination with the pair of seed-boxes, of the pair of feed-slides $f^7$, arranged in line with each other, and reciprocating toward and from each other, the springs $f^{18}$ on the said slides, tending to throw the same into their outermost or closed position, the pivoted lever $f^{23}$ with the flexible connections $f^{20}$, passing over the guide-sheaves $f^{21}$, for moving the said slides inward to their dropping position against the resistance of said springs, and the constantly running shaft $g'$ with crank $g^2$, for cooperation with said lever $f^{23}$, to produce the dropping action, substantially as described.

2. In a two-row planter, the combination with a pair of seed boxes, and the pair of feed slides, of the means for operating said slides, comprising the springs $f^{18}$, the pivoted lever $f^{23}$, the flexible connections $f^{20}$, the guide sheaves $f^{21}$, the constantly running crank cam shaft $g'$ $g^2$, the main wheels $b$, and an increasing drive from the main wheels to said shaft having therein a clutch, for throwing said shaft in and out of gear, substantially as described.

3. The combination with the axle $a$, wheels $b$ and the shaft $g'$ $g^2$, of the sprocket $g^5$ on said shaft, the chain $g^6$, the sprocket $g^7$ loose and slidable on said axle, the half clutch member $g^8$ and $g^9$, the shipper-fork $g^{10}$ and the hand lever $g^{12}$, all arranged and operating substantially as described.

4. The combination with the two-row planter, of the markers pivoted to the planter frame, the lock-plates $p^{13}$ and the yielding spring holders $p^8 p^{10} p^{12}$ connecting the marker arms with the frame, for yieldingly holding and manipulating the same, substantially as described.

In testimony whereof we affix our signatures in presence of two witnesses.

HENRY H. GUNNER.
FRANK O. SHIRLEY.

Witnesses:
  HENRY HAMMANG,
  A. J. LAWIN.